(12) United States Patent
Boudreaux, Jr. et al.

(10) Patent No.: US 6,927,954 B2
(45) Date of Patent: Aug. 9, 2005

(54) METHOD AND APPARATUS FOR LIMITING GROUND FAULT CURRENT

(75) Inventors: Ralph R. Boudreaux, Jr., Madison, AL (US); John S. McGary, Petersburg, TN (US); Steven M. Robinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 558 days.

(21) Appl. No.: 10/098,097

(22) Filed: Mar. 13, 2002

(65) Prior Publication Data

US 2003/0174451 A1 Sep. 18, 2003

(51) Int. Cl.[7] ................................................ H02H 3/00
(52) U.S. Cl. ....................................................... 361/42
(58) Field of Search ............................ 361/42, 49, 93.8, 361/93.1

(56) References Cited

U.S. PATENT DOCUMENTS

| | | | | |
|---|---|---|---|---|
| 4,385,336 A | * | 5/1983 | Takeshita et al. | 379/29.03 |
| 5,272,617 A | * | 12/1993 | Nakamura | 363/51 |
| 5,438,606 A | * | 8/1995 | Cerulli | 379/24 |
| 5,774,316 A | | 6/1998 | McGary et al. | 361/42 |
| 5,774,613 A | | 6/1998 | Tunabe et al. | 385/84 |
| 5,862,200 A | * | 1/1999 | Sheets | 379/22.03 |

* cited by examiner

*Primary Examiner*—Brian Sircus
*Assistant Examiner*—James A Demakis
(74) *Attorney, Agent, or Firm*—Allen, Dyer, Doppelt, Milbrath & Gilchrist P.A.

(57) ABSTRACT

A ground fault current-limiting circuit for limiting telecommunication wireline voltage and ground fault current to prescribed safety parameters has a ground fault current sense resistor and associated line voltage control circuit installed in a ground-coupling link to the center tap of the output winding of a bipolar voltage converter's output transformer. The control circuit compares ground fault current of either polarity flowing through the sense resistor to a prescribed value. In response to this current limit being exceeded, the control circuit produces an output signal that causes the power source to reduce its output voltage so that the ground fault current will drop to within acceptable limits.

16 Claims, 3 Drawing Sheets

METHOD AND APPARATUS FOR LIMITING GROUND FAULT CURRENT

FIELD OF THE INVENTION

The present invention relates in general to power management systems and subsystems therefor, and is particularly directed to a new and improved control circuit for automatically interrupting or reducing the voltage supplied to a span-powered telecommunication link, and thereby limit ground current to a level that complies with established safety standards, in response to detecting a fault condition between the powered span and ground.

BACKGROUND OF THE INVENTION

In addition to sending voice and/or data over the telephone lines, a telecommunication service provider may use the set of same wires to power devices that are connected to the signal lines at remote locations. This practice, generally referred to as 'loop' or 'span'-powering, permits the phone company to power equipment located up to several miles away from power source (typically installed in the central office (CO)), and is used extensively in HDSL, HDSL2, HDSL4, DDS, ISDN and T1 network applications.

However, as the distance between the power source and the remotely powered device increases, and it becomes necessary to increase the magnitude of the source voltage to compensate for the additional voltage drop associated with the span resistance, a potential safety hazard (to maintenance personnel, for example) exists once the source voltage is increased to a relatively high value. If an individual inadvertently comes in contact with a powered line, that person becomes a current path to ground. Because the ground fault current through the human body is typically considerably lower than the load current, the high voltage power source will experience only an imperceptible increase in power; however, the ground fault current can be fatal.

While this potential hazard may be avoided by de-energizing the high voltage source, doing so is undesirable, since it would cause a service outage to the customer. To remedy this problem, the telecommunication industry has established voltage and current limits for allowing safe access to a powered span. In order to comply with these standards, yet still provide a relatively high voltage to the remote device, it is common practice to employ a bipolar power source, to reduce the absolute value of a line to ground voltage, yet realizing a higher differential voltage across the powered span.

This approach is diagrammatically illustrated in FIG. 1, which shows the output stage of a typical bipolar power converter (such as that contained in a central office) having an output transformer winding 10 with a first polarity (+) terminal 11 coupled through a diode 21 over a line 31 to one end 41 of a piece of telecommunication equipment, shown as a resistive load 40, and a second polarity (−) terminal 12 coupled through a diode 22 over a line 32 to a second end 42 of the load 40. Output transformer winding 10 has a (center) tap 15 thereof coupled to a ground terminal GND. On the positive side, a storage capacitor 51 is coupled between the cathode of diode 21 and GND; on the negative side, a storage capacitor 52 is coupled between the anode of diode 22 and GND. With this differential polarity configuration the output voltage of the power converter (e.g., +/−140 VDC) can be effectively doubled across the load (e.g., to a value of +280 VDC). Under normal operating conditions, current flows only through the circuit containing the load 40, not to ground.

FIG. 2 shows a modification of the circuit of FIG. 1 for the circumstance that a fault (such as a person—shown as a resistor 61) is placed between the positive (+) output line 31 and ground. In this event, a 'ground fault' current flows from the positive (+) output line 31 through resistor 61 to ground. A complementary situation arises when a fault is formed between the negative (−) line 32 and ground. In either event, both immediate detection and compensation for the high voltage and associated ground current condition are required. Conventional proposals to address this problem are often complex and have included the use of Hail effect devices and/or coupled inductors for monitoring current imbalance on the output lines. Other methods such as described in U.S. Pat. No. 5,774,316, generate a separate ground-referenced voltage through which fault current is measured.

SUMMARY OF THE INVENTION

The present invention is directed to a reduced complexity circuit configuration for limiting line voltage and ground fault current to prescribed safety parameters, by exploiting the architecture of a bipolar voltage generator of the type shown in FIGS. 1 and 2. In particular, the present invention installs a ground fault current sense and line voltage control circuit in the ground-coupling link to the center tap of the output winding of the converter's output transformer, and thereby provides a path for measuring ground fault current, so long as the load is not connected to ground.

As will be described, the control circuit is operative to compare ground fault current of either polarity to a prescribed value. In response to this current limit being exceeded, the control circuit produces an output signal that causes the power source to reduce its output voltage to a value that will bring the ground fault current to within acceptable limits. In a first embodiment, a ground fault current sense resistor is coupled between the output winding's center tap and ground. This effectively places the sense resistor in series with each of the two storage capacitors for the respective opposite polarity rectified voltage outputs at the output winding terminals and ground. The voltage across the sense resistor is coupled to the base emitter junctions of a pair of complementary voltage-sensing transistors, whose output terminals are coupled in common to an output node for controlling the supply voltage.

In response to a ground fault on either powered line, a low resistance circuit path will be placed across one of two RC series circuits formed of the storage capacitors and the sense resistor. This causes one of the capacitors to discharge through the sense resistor, and the voltage across the sense resistor resulting from the current flow therethrough will be applied to the base-emitter junctions of the two transistors. If the ground current is large enough to cause forward conduction of which transistor is forward-biased, there is a resulting collector current at the output node. This signal is coupled over a feedback loop to adjust (reduce) the high voltage of the power source to a safe level. For a very large ground current sufficient to cause full forward conduction of the forward-biased transistor, the output signal may be used to switch off or interrupt the power source.

In a second embodiment, the configuration of the first embodiment is augmented to include transient fault protection, and to improve noise immunity and sensitivity to longitudinal induction. For transient protection, the ground fault sense resistor is coupled to the output winding's center tap by way of a surge-compensation resistor and Zener diodes are connected in series in an opposite polarity sense across the sense resistor. For noise immunity, RC filters are coupled to the transistors' bases.

DETAILED DESCRIPTION

Figure 2:
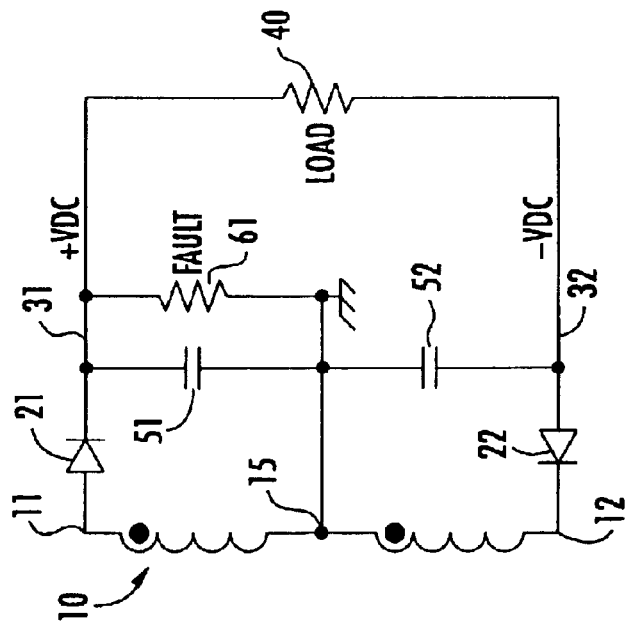
FIG. 2 shows a modification of the circuit of FIG. 1 for a fault condition between the positive line and ground.
Figure 1:
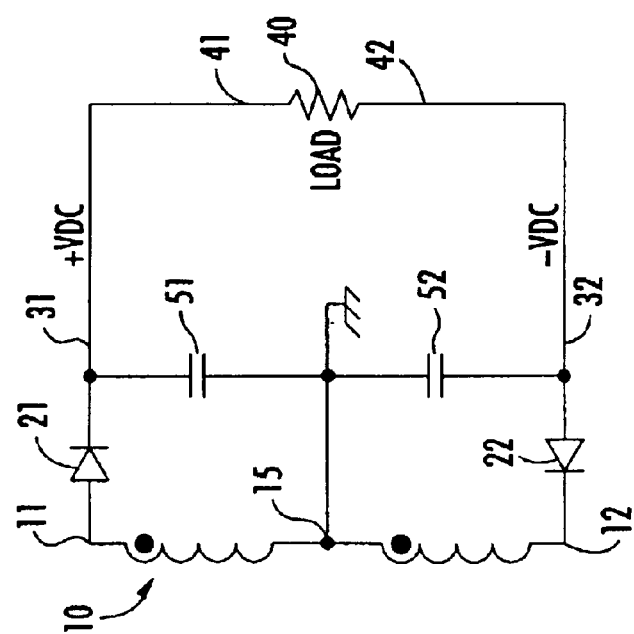
FIG. 1 diagrammatically illustrates the differential coupling of the output stage of a bipolar power converter to power a telecommunication line pair.
Figure 3:
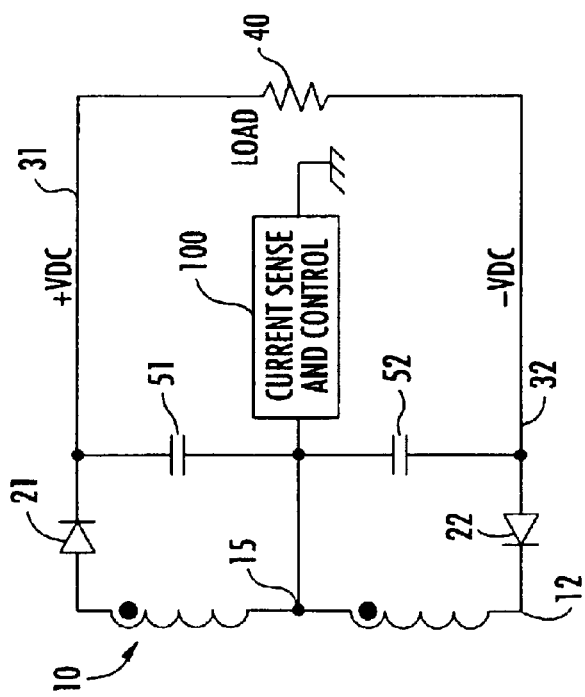
FIG. 3 shows a modification of the bipolar voltage generator of FIG. 1 in accordance with the present invention, to include a ground fault current sense and line voltage control circuit.
Figure 6:
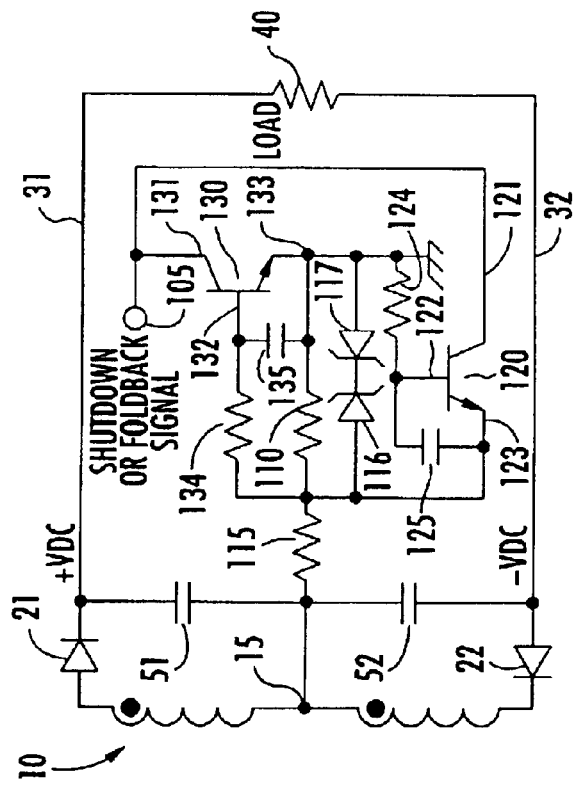
FIG. 6 schematically illustrates a second embodiment of the control circuit of the invention, in which the embodiment of FIG. 5 is augmented to include transient fault protection, and improve noise immunity and sensitivity to longitudinal induction.

Attention is now directed to FIG. 3, which shows a modification of the bipolar voltage generator of FIG. 1 in accordance with the present invention, to include a ground fault current sense and line voltage control circuit 100 between the output transformer winding's center tap 15 and ground. Installing the control circuit 100 (non-limiting circuit implementations of which are shown in FIGS. 5 and 6, to be described) between the winding 10 and ground creates a path for measuring ground fault current, so long as the load 40 is not connected to ground.

Figure 4:
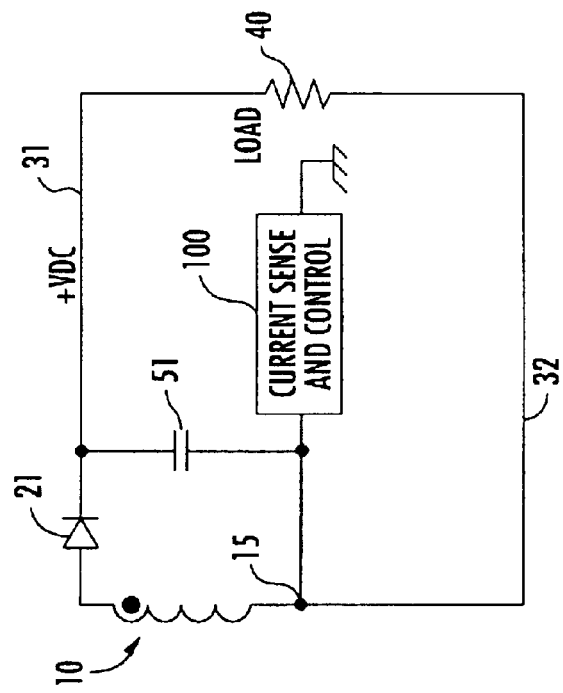
FIG. 4 shows a unipolar output configuration of FIG. 3 resulting from moving the output winding's tap to its negative polarity terminal.

Control circuit 100 is operative to compare current (of either polarity) therethrough to a prescribed (safety limit) value. In response to the limit being exceeded, control circuit 100 generates an output signal that is used to either shut off the power source or cause it to reduce its output voltage, so that the monitored ground fault current drops to within acceptable limits. Although the output tap 15 is shown in FIG. 3 as being placed at a center tap location, its position along the output winding 10 may be displaced as desired. For example, as shown in FIG. 4, the output winding's tap 15 may be moved all the way to the negative polarity (-) terminal 12 to realize a unipolar output configuration.

Figure 5:
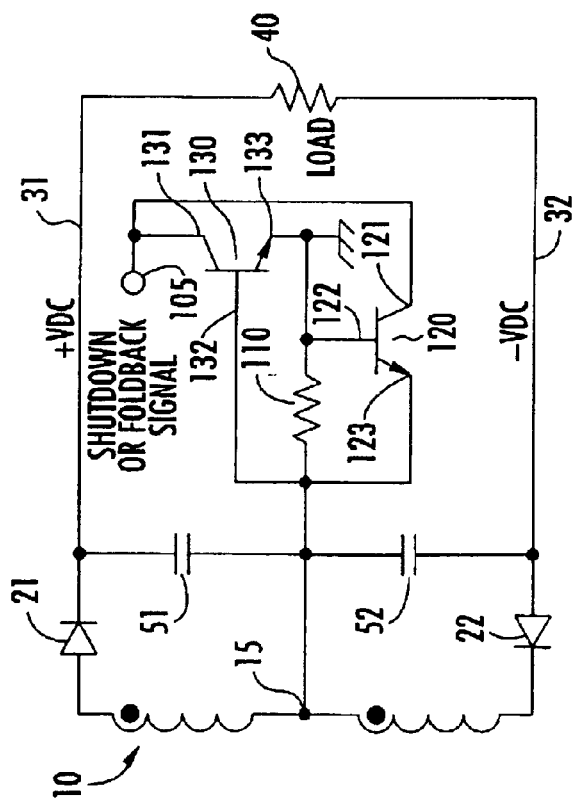
FIG. 5 schematically illustrates a first embodiment of the control circuit of the present invention.

FIG. 5 schematically illustrates a first embodiment of the control circuit 100 for the bipolar voltage generator architecture of FIG. 3. A ground fault current sense resistor 110 is coupled between the center tap 15 and ground. This effectively places the sense resistor in series with each of the two storage capacitors 51 and 52, between their associated (+) and (-) lines and ground. Coupled across the sense resistor 110 are a pair of complementary voltage-sensing transistors 120 and 130, output terminals of which are coupled in common to an output node 105. Although bipolar NPN devices are shown, it is to be understood that the invention is not limited thereto, but also may be implemented using alternative equivalent components, such as PNP transistors, or field effect transistors (FETs), for example.

To measure ground fault current associated with a ground fault to the positive (+) line 31, the NPN transistor 120 has its collector 121 coupled to output node 105, its base 122 coupled to the ground-connected end of sense resistor 110 and its emitter 123 coupled to the center tap-connected end of sense resistor 110. In a complementary manner, to measure ground fault current associated with a ground fault to the negative (-) line 32, NPN transistor 130 has its collector 131 coupled to output node 105, its base 132 coupled to the center tap-connected end of sense resistor 110, and its emitter 133 coupled to the ground-connected end of the sense resistor 110.

In operation, a ground fault between the positive line 31 and ground will effectively place a low resistance circuit path across the RC series circuit formed of storage capacitor 51 and sense resistor 110. As capacitor 51 discharges, the voltage across the sense resistor 110 resulting from the resulting current flow therethrough is applied to the base-emitter junctions of the transistors 120 and 130. Since current associated with a positive line ground fault flows from ground through resistor 110 toward the center tap, the resulting voltage across sense resistor 110 will be applied in a reverse-bias sense to the base-emitter junction of transistor 130, but will be applied in a forward-bias sense to the base-emitter junction of transistor 120. (For opposite polarity (PNP) devices, the ground fault polarity sensitivities of the transistors 120 and 130 would be reversed.)

If the ground current is large enough to cause forward conduction of transistor 120, there is a resulting collector current at output node 105. This signal is coupled over a feedback loop to adjust (reduce) the high voltage of the power source to a safe level. For a very large ground current sufficient to cause full forward conduction of transistor 120, the output signal may be used to switch off or interrupt the power source.

In a complementary manner, a ground fault to the negative line 32 will place a low resistance circuit path across the RC series circuit formed of storage capacitor 52 and the sense resistor 110. As capacitor 52 discharges, current associated with the negative line ground fault flows through resistor 110 toward ground, so that the resulting voltage across sense resistor 110 will be applied in a reverse-bias sense to the base-emitter junction of transistor 120, but will be applied in a forward-bias sense to the base-emitter junction of transistor 130.

For binary threshold operation, rather than couple the voltage across sense resistor 110 in a complementary manner to the base-emitter junctions of a pair of transistors, it may be coupled to a first input of comparator or operational amplifier circuit, a second input of which is coupled to receive a prescribed reference voltage. In response to the voltage across the sense resistor 110 exceeding the threshold, the output of the circuit changes state, to signal the power supply to reduce its output to a preset level.

FIG. 6 schematically illustrates a second embodiment of the control circuit 100 for the bipolar voltage generator architecture of FIG. 3, in which the embodiment of FIG. 5 is augmented to include transient fault protection, and to improve noise immunity and sensitivity to longitudinal induction. In particular, for transient protection, the ground fault sense resistor 110 is coupled to the center tap 15 of output winding 10 by way of a surge-compensation resistor 115, and Zener diodes 116 and 117 are connected in series in an opposite polarity sense across the sense resistor 110. For noise immunity, the base 122 of transistor 120 is coupled through a resistor 124 to ground and through a (60 Hz) noise rejection capacitor 125 to its emitter 123.

Similarly, the base 132 of transistor 130 is coupled through a resistor 134 to the node between sense resistor 110 and resistor 115, and through a noise rejection capacitor 135 to its emitter 123. In addition, when it is intended that the control circuit be used to linearly reduce the supply voltage, the emitter 123 of transistor 120 may be coupled through an emitter resistor to the common connection of resistors 110 and 115, while the emitter 133 of transistor 130 may be coupled through an emitter resistor to ground. The emitter resistors serve to decrease dependence on transistor forward gain and scale the foldback range.

As will be appreciated from the foregoing description, by installing a ground fault current sense and line voltage control circuit between the center tap of the output winding of a bipolar voltage converter's output transformer and a ground terminal reference, the present invention is able to provide a relatively reduced complexity (and cost) solution to measuring and limiting ground fault current in a span powered telecommunication network. Through the use of pair of relatively simple threshold detection circuits, the invention compares ground fault current of either polarity to a prescribed value. In response to this current limit being exceeded, the control circuit produces an output signal that causes the power source to reduce its output voltage to a value that drops the ground fault current to within acceptable limits.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with a telecommunication line pair transporting telecommunication signals and delivering power from an output transformer winding of a rectified voltage generator at a telecommunication facility to remote terminal equipment, a method of limiting ground fault current comprising the steps of:

(a) connecting a first end of a current flow sense element to ground and coupling a second end of said current flow sense element to a tap location of said output transformer winding, such that current flow through said current sense element is exclusive of current supplied by a voltage source other than said output transformer winding of said telecommunication line pair;

(b) monitoring current flow through said current flow sense element; and (c) in response to current flow through said current flow sense element monitored in step (a) having a value representative of the occurrence of a ground fault on said telecommunication line pair, causing said rectified voltage generator to reduce its output voltage.

2. The method according to claim 1, wherein said rectified voltage generator comprises a bipolar voltage generator having respective rectified output terminals of said output transformer winding coupled to respective lines of said telecommunication line pair to which said remote terminal equipment is connected.

3. The method according to claim 2, wherein step (a) comprises coupling said current flow sense element between ground and a center tap location of said output transformer winding.

4. The method according to claim 2, wherein said bipolar voltage generator has respective storage capacitors coupled between said respective rectified output terminals and said tap of said output transformer winding.

5. A ground fault current limiting circuit for a telecommunication line pair used to transport telecommunication signals to remote terminal equipment, and delivering power from an output transformer winding of a rectified voltage generator at a telecommunication facility to said remote terminal equipment, said ground fault current limiting circuit comprising:

a current flow sense element having a first end thereof connected to ground and a second end thereof coupled to a tap location of said output transformer winding, such that current flow through said current flow sense element is exclusive of current supplied by a voltage source other than said output transformer winding of said telecommunication line pair; and a current flow monitoring circuit coupled to said current flow sense element and being operative, in response to current flow through said current flow sense element being representative of the occurrence of a ground fault on said telecommunication line pair, to generate output that causes said rectified voltage generator to reduce its output voltage, thereby limiting said ground fault current.

6. The ground fault current limiting circuit according to claim 5, wherein said rectified voltage generator comprises a bipolar voltage generator having respective rectified output terminals of said output transformer winding coupled to respective lines of said telecommunication line pair to which said remote terminal equipment is connected.

7. The ground fault current limiting circuit according to claim 6, wherein said current flow sense element is coupled between ground and a center tap location of said output transformer winding.

8. The ground fault current limiting circuit according to claim 6, wherein said bipolar voltage generator has respective storage capacitors coupled between said respective rectified output terminals and said tap of said output transformer winding.

9. The ground fault current limiting circuit according to claim 8, wherein said current flow sense element comprises a ground fault current sense resistor, having a voltage drop thereacross coupled to complementary connected voltage comparator circuits, output terminals of which are coupled in common to an output node for controlling said rectified voltage generator.

10. The ground fault current limiting circuit according to claim 9, wherein said complementary connected voltage comparator circuits comprises respective transistors, each having in input terminal, an output terminal and a control terminal, and wherein output terminals of said transistors are coupled in common to said output node, and wherein control-input terminals of said transistors are coupled across said ground fault sense resistor.

11. The ground fault current limiting circuit according to claim 10, wherein said current flow monitoring circuit further includes an additional, surge-compensation resistor coupled between said second end of said ground fault sense resistor and said tap of said output transformer winding, and Zener diodes connected in complementary-polarity manner across said ground fault sense resistor, and resistor-capacitor filters coupled to said control and output electrodes of said transistors.

12. For use with a telecommunication wireline pair that conveys telecommunication signals to remote terminal equipment, and supplies power to said remote terminal equipment from an output transformer winding of a bipolar rectified voltage generator at a telecommunication facility, said bipolar rectified voltage generator having respective capacitors coupled between a tap of said output transformer winding and opposite polarity voltage terminals coupled to respective wirelines of said wireline pair, a ground fault current limiting circuit comprising:

a ground current sense resistor having a first end thereof connected to a ground terminal and a second end thereof coupled to said tap of said output transformer winding, such that current flow through said ground current sense resistor is exclusive of current supplied by a voltage source other than said output transformer winding of said telecommunication wireline pair; and a current flow monitoring circuit coupled to monitor a voltage drop across said ground current sense resistor in accordance with current flow therethrough and, in response to said voltage drop being sufficient to indicate the occurrence of a ground fault on either wireline of said telecommunication wireline pair, being operative to generate an output is coupled to control said bipolar rectified voltage generator to reduce its output voltage, thereby limiting said ground fault current.

13. The ground fault current limiting circuit according to claim 12, wherein said ground current sense resistor is coupled between ground and a center tap location of said output transformer winding.

14. The ground fault current limiting circuit according to claim 13, wherein said current flow monitoring circuit comprises complementary connected voltage comparator circuits, coupled to monitor said voltage drop across said ground current sense resistor, and output terminals coupled to control said bipolar rectified voltage generator.

15. The ground fault current limiting circuit according to claim 14, wherein said complementary connected voltage comparator circuits comprises respective transistors, each having in input terminal, an output terminal and a control terminal, and wherein output terminals of said transistors are coupled in common to said output node, and wherein control-input terminals of said transistors are coupled across said ground current sense resistor.

16. The ground fault current limiting circuit according to claim 15, wherein said current flow monitoring circuit further includes an additional, surge-compensation resistor coupled between said sense resistor and said tap of said output transformer winding, and Zener diodes connected in complementary-polarity manner across said sense resistor, and resistor-capacitor filters coupled to said control and output electrodes of said transistors.

* * * * *